(12) United States Patent
Blondeau

(10) Patent No.: US 9,391,987 B2
(45) Date of Patent: Jul. 12, 2016

(54) BIOMETRIC PERSONAL AUTHENTICATION

(71) Applicant: IONOSYS, Sceaux (FR)

(72) Inventor: Stephane Blondeau, Sceaux (FR)

(73) Assignee: IONOSYS, Sceaux (FR)

( * ) Notice: Subject to any disclaimer, the term of this patent is extended or adjusted under 35 U.S.C. 154(b) by 0 days.

(21) Appl. No.: 14/418,076

(22) PCT Filed: Jul. 31, 2013

(86) PCT No.: PCT/EP2013/066132
§ 371 (c)(1),
(2) Date: Jan. 28, 2015

(87) PCT Pub. No.: WO2014/020087
PCT Pub. Date: Feb. 6, 2014

(65) Prior Publication Data
US 2015/0264045 A1    Sep. 17, 2015

(30) Foreign Application Priority Data
Jul. 31, 2012 (FR) ...................... 12 57409

(51) Int. Cl.
*G06F 7/04* (2006.01)
*H04L 29/06* (2006.01)
*G06F 21/31* (2013.01)
*G06F 21/32* (2013.01)
*G06F 21/41* (2013.01)
*H04L 29/08* (2006.01)

(52) U.S. Cl.
CPC ............ *H04L 63/0861* (2013.01); *G06F 21/31* (2013.01); *G06F 21/32* (2013.01); *G06F 21/41* (2013.01); *H04L 63/0492* (2013.01); *H04L 67/02* (2013.01); *G06F 2221/2115* (2013.01); *G06F 2221/2139* (2013.01)

(58) Field of Classification Search
None
See application file for complete search history.

(56) References Cited

U.S. PATENT DOCUMENTS

| 2010/0052898 | A1* | 3/2010 | Allen | ................ A61B 5/01 340/539.12 |
| 2012/0316455 | A1* | 12/2012 | Rahman | ................ G01C 22/006 600/547 |

* cited by examiner

*Primary Examiner* — Brandon Hoffman
(74) *Attorney, Agent, or Firm* — Blakely Sokoloff Taylor & Zafman LLP

(57) ABSTRACT

A module for authenticating a person is characterized in that it comprises:
- a processing circuit (102) comprising an authentication memory (104),
- a sensor (106) of a physiological parameter of the wearer,
- a means (108) for inactivating the circuit (202) responsive to the sensor (106) and capable of inactivating the circuit (102) when said sensor (106) does not receive an expected physiological signal,
- a circuit (110) for wireless nearfield communications with a base (20), capable of communicating with said base (20) according to a protocol involving biometric data distinct from said physiological parameter and intended to be received by the module (10), and
- means (112) for transmitting presence validation signals for said base (20) and or for receiving presence validation signals, distinct from said communications circuit (110).

22 Claims, 8 Drawing Sheets

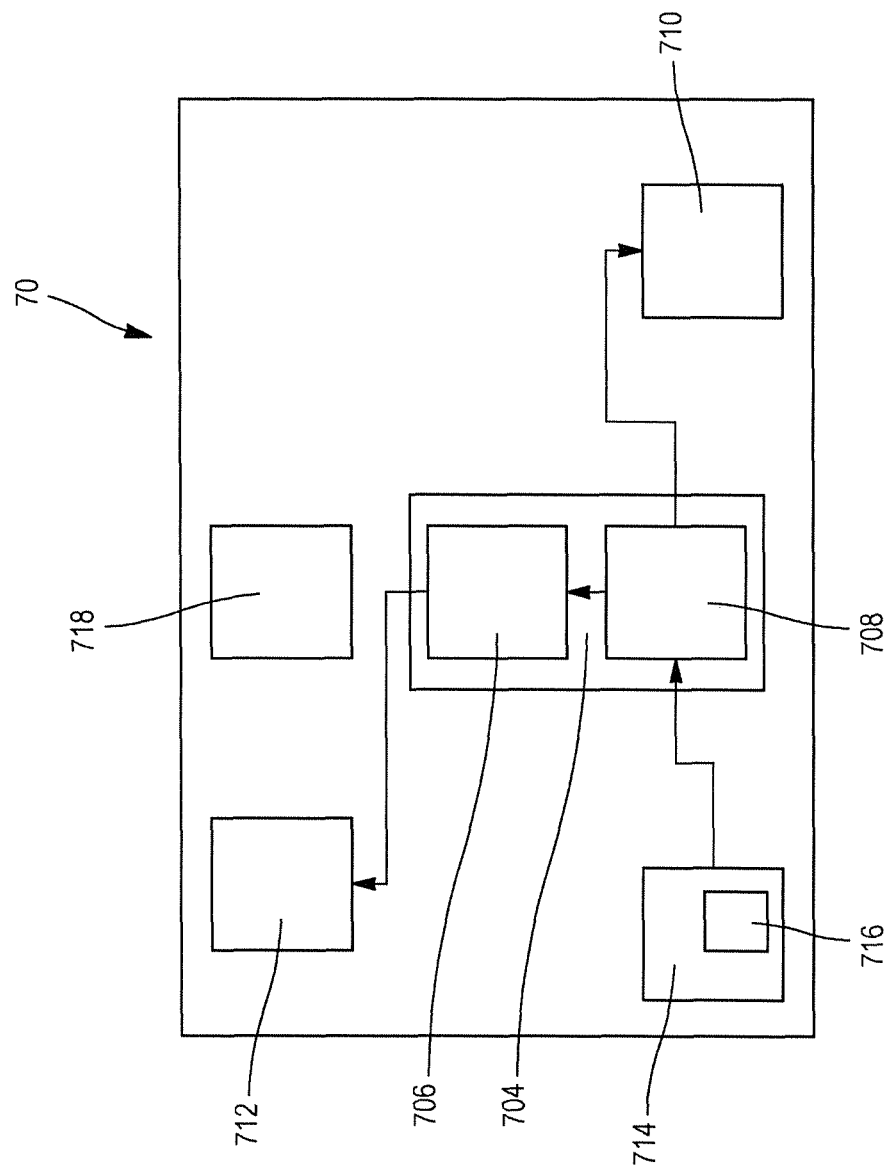

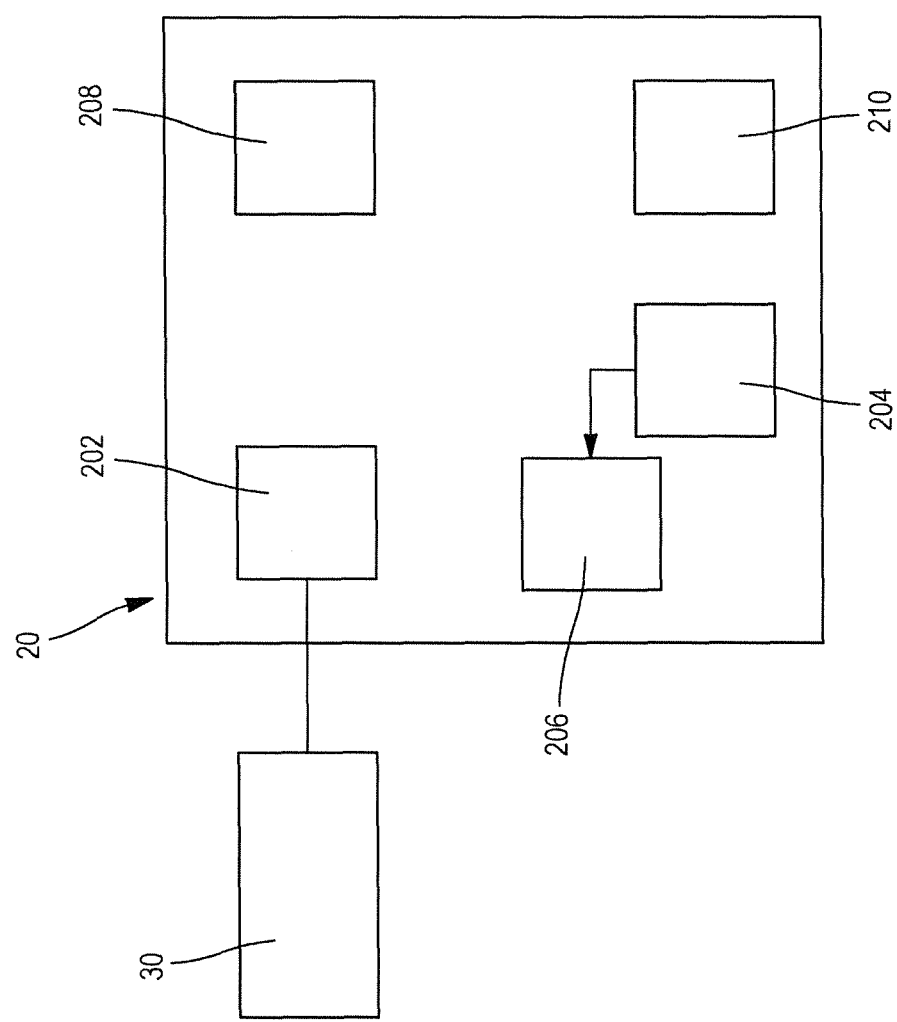

BIOMETRIC PERSONAL AUTHENTICATION

FIELD OF THE INVENTION

The invention relates to the biometric authentication of persons.

BACKGROUND

There exists many physical identification and authentication means for achieving secure transactions. For example, a smart card allows authenticating a user by the user entering a secret code via a dedicated terminal, this code being compared with an expected code expected by a secure protocol. However, such a card does not protect against use, typically fraudulently, by someone other than the authentic user if that person was able to obtain the secret code.

Such a drawback can be compensated by implanting subcutaneous chip under the skin of the user. Such implantation ensures the authenticity of the user. However, this is a particularly intrusive solution as it requires a specialized act and as the user cannot easily remove it.

Another known solution consists in using a biometric data unique to the authentic user. One possibility is thus to realize a biometric check of said data, by a device comprising a reader of this data (e.g., a fingerprint) forming a dedicated base, whenever the user wishes to perform an operation. However the security of such a system can be considered as limited. In particular, in terms of security, identification and authentication are entirely dependent on a measurement performed by the base. Thus, during each authentication, it is necessary to reproduce the biometric measurement. Moreover, such a system can perform user authentication only on the basis of particular biometric data (e.g. a fingerprint) that the base used for authentication us capable of measuring.

SUMMARY OF THE INVENTION

An aim of the invention is to enable a highly secure identification and authentication while offering great flexibility and ease of use.

To this end, there is provided a module for authenticating a wearer, characterized in that it comprises:
 a processing circuit comprising an authentication memory,
 a sensor of a physiological parameter of the wearer,
 a means for inactivating the circuit responsive to the sensor and capable of inactivating the circuit when said sensor does not receive an expected physiological signal,
 a circuit for wireless nearfield communications with a base, capable of communicating with said base according to a protocol involving biometric data distinct from said physiological parameter and intended to be received by the module, and
 means for transmitting presence validation signals for said base and or for receiving presence validation signals, distinct from said communications circuit.

This module is advantageously supplemented by the following features, taken individually or in any of their technically possible combinations:
 the means for transmitting presence validation signals to said base and/or for receiving presence validation signals are means for transmitting presence validation signals to said base and/or for receiving presence validation signals from said module.
 the signals are acoustic signals adapted to be transported by the wearer's body.
 the signals are electric signals adapted to be transported by the wearer's body.
 the signals are optical signals.
 the sensor of a physiological parameter in selected among a body temperature sensor, a heart rate sensor and a skin conductivity sensor.
 the module further comprises a second means for inactivating the circuit, responsive to a means for detecting the presence of the module on or in a support for said module on a wearer's body.

The invention also provides an assembly of a module as defined above and a support for said module, characterized in that the support is in the form of a strap.

This assembly is advantageously supplemented by the following features:
 said strap comprises means connected to the module for detecting the closure of the strap on itself.
 the closure detection means are selected from a group comprising the electrical contact devices and the devices exhibiting electrical properties variations as a function of their deformation.

It is further provided according to the invention an authentication base for a module as defined above, characterized in that it comprises:
 means for interfacing with a personal digital device,
 means for controlling a circuit for wireless nearfield communications with said module,
 means for acquiring and storing biometric data of a wearer of the module, and
 means for transmitting presence validation signals to said module and or for receiving presence validation signals from said module, distinct from said communications circuit.

This base is advantageously supplemented by the following features, taken individually or in any of their technically possible combinations:
 the base further comprises the communications circuit, controlled by the control means.
 the biometric data acquisition means involve a contact with a wearer's body, and the presence validation signals intended to said module and/or originating from said module are acoustic or electrical signals.
 the signals are modulated.
 the biometric data are fingerprint data.
 the biometric acquisition means operate contactless with a wearer's body, and wherein the means for transmitting and/or receiving presence validation signals comprise means for transmitting and/or detecting optical signals.
 the optical signals comprise a modulated optical signal.
 the optical signals comprise a graphic pattern.
 the biometric data are venous network data, in particular a palmar venous network.

Finally, it is proposed a combination of an authentication module and of an authentication base as defined above, further comprising means for authorizing the module or the base to access the biometric data only when the presence validation signals transmitted by said module are validly detected by said base.

This combination is advantageously supplemented by the following features, taken individually or in any of their technically possible combinations:
 it further comprises means for authorizing the module or the base to access the biometric data only when the presence validation signals transmitted by said base are validly detected by said module.
 it further comprises means for comparing the biometric data acquired by the base with reference biometric data.

- the comparison means are provided in the module, the biometric data acquired by the base being transmitted to the module via the wireless nearfield communication circuits.
- the comparison means are provided in the base, the reference biometric data being stored in the module and transmitted to the base via the wireless nearfield communication circuits.
- the authentication memory of module is capable of storing authentication data sets capable of being communicated to said base and/or to the personal digital device interfaced via the wireless nearfield communications circuits for the purpose of transacting with digital devices connected with said base.

BRIEF DESCRIPTION OF THE FIGURES

Other features, aims and advantages of the invention will appear from the following description of an embodiment. In the accompanying drawings:

FIG. 3 shows a practical architecture of an assembly according to one embodiment of the invention, FIG. 4 shows an architecture of the authentication base of a person according to an embodiment of the invention.

DETAILED DESCRIPTION OF THE INVENTION

1) Example of a Worn Module a) Module Portion

Figure 1A:
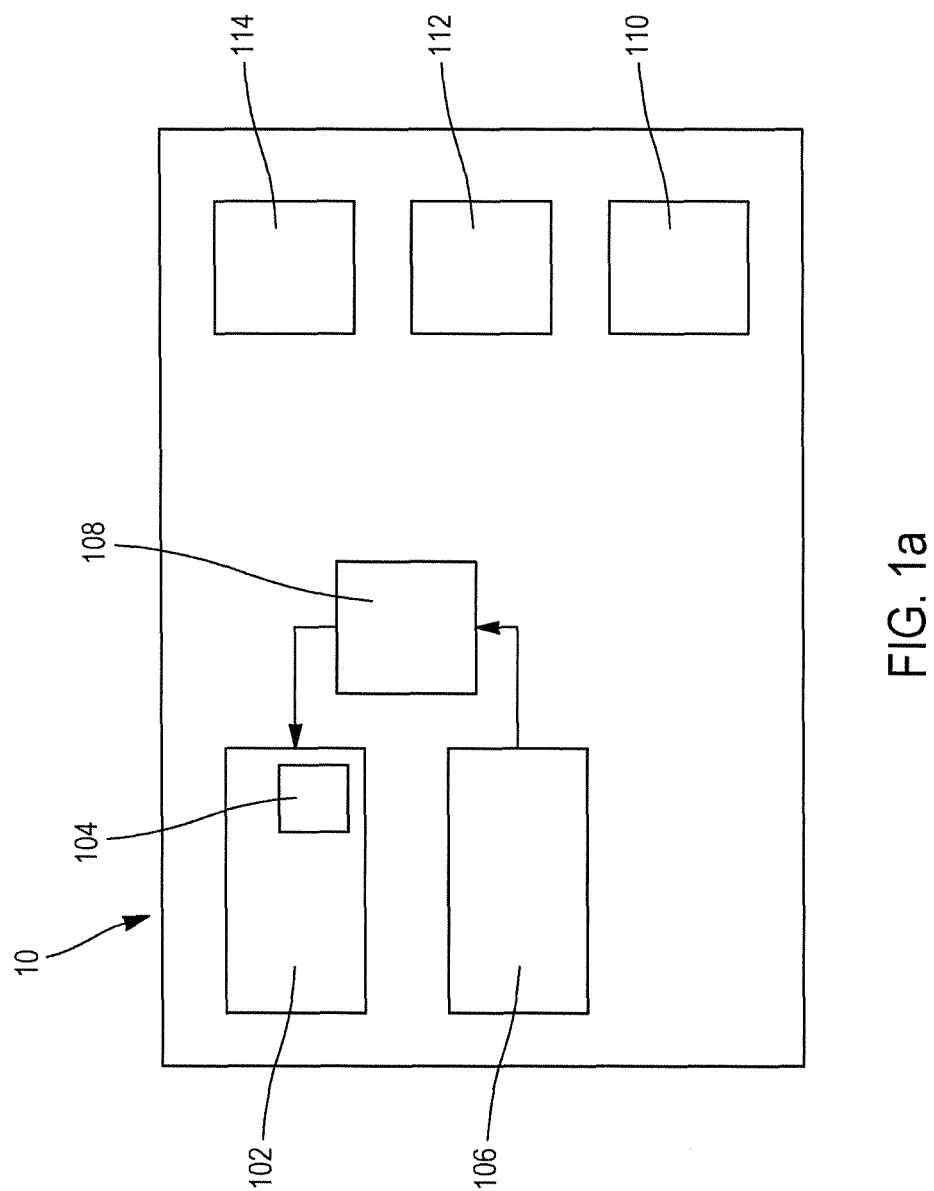
FIG. 1a shows the architecture of a person authentication module according to an embodiment of the invention.
Figure 1B:
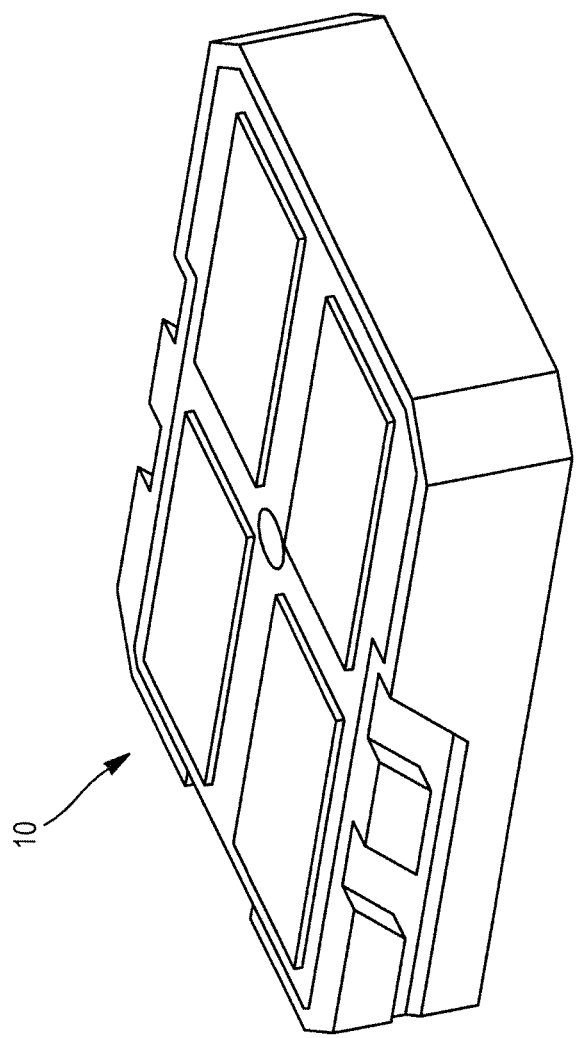
FIG. 1b shows a possible practical embodiment of the module of FIG. 1.

Referring to FIGS. 1a and 1b, a module 10 for authenticating a person is described.

This module 10 is intended to be worn by a user, so-called "wearer" of the module.

Module 10 includes a processing circuit 102 comprising an authentication memory or secure memory 104.

Physiological Parameter Sensor

Module 10 also includes a sensor 106 of a physiological parameter of the user who carries the module.

By physiological parameter is meant any physiological parameter that can be measure directly on the wearer.

When the module is worn by the user, sensor 106 measures the physiological parameter. This measurement will certify that module 10 is positioned on the wearer's body.

Such a physiological parameter can be a biometric parameter, i.e. adapted to allow biometric identification of the wearer as known by the skilled person, but it can also be a parameter of the wearer does not allow a biometric identification, particularly not a unique identification or not an identification with an accuracy level corresponding to a biometric identification.

The physiological parameter is for example a body temperature, a heart rate or skin conductivity.

Inactivation Means

Sensor 106 is associated with a means 108 for inactivating the processing circuit 102 which is responsive to information provided by the sensor 106 and capable of inactivating the processing circuit 102 when said sensor 106 does not receive an expected physiological signal. Indeed, memory 104, connected to sensor 106, may contain an expected biometric information type or format.

Inactivation means 108 for example comprises an inactivation circuit including a microcontroller.

The assembly formed by memory 104, sensor 106 and inactivation means 108 thus forms an autonomous wearer authentication means.

This assembly thus fulfills a first function, i.e. the selective inactivation of the module (which was initially activated by any means known per se).

Sensor 106 can operate continuously or perform measurements at regular intervals and/or at predefined times. Alternatively, the activation of sensor 106 may be conditioned to the detection of an alert signal. This alert signal originates for instance from a worn assembly in which module 10 is included. The alert signal is for example a signal of detection of the opening of a strap 40 on which on module 10 is mounted, as described in greater detail below.

Wireless Communication Circuit

Module 10 includes a circuit 110 for wireless nearfield communication with a base 20. The communication circuit 110 is capable of communicating with said base 20 according to a protocol involving data stored in a memory of the module (typically memory 104).

Base 20 is for example a base 20 allowing activation of module 10. By activation, it is meant the initial activation of module 10, during which module 10 can be customized by storing data or successive activations in the memory. During these successive activations, the stored data are involved at the time of module activation.

These data preferably are biometric data, but may include more generally any data related to the user and allowing his identification. The wireless communication circuit 110, involving a communication according to a protocol using identification data, typically biometric data, thus forms a means for authenticating the wearer, here vis-à-vis the base 20.

The identification data may be representative of a biometric parameter or a plurality of biometric parameters. The biometric data have an accuracy that is sufficient to enable the implementation of a biometric identification as known to the skilled person, particularly with the certainty required for such measurements according to the knowledge of the skilled person.

These biometric data are preferably distinct from said physiological parameter measured by sensor 106, i.e. the biometric data are representative of at least one biometric parameter of the wearer, the parameter being different from that measured by sensor 106.

The distinction is therefore made at the represented parameter level, and may therefore involve a different format as well as data in themselves different as being representative of a different identified parameter. For example, the physiological parameter may be the skin conductivity and the biometric data may be representative of the iris of a wearer's eye or a fingerprint.

The biometric data may for example include biometric data representative of the physiological parameter measured by sensor 106, if the latter allows a biometric recognition, and biometric data representative of a different parameter.

It is thus possible to obtain increased security in that the authentication can in particular be based on at least two distinct parameters, one being measured by module 10 and being used by inactivation means 108, the other being used by the wireless communication protocol.

The biometric data distinct from said physiological parameter measured by sensor 106 can be measured by another sensor, or previously stored in a module memory (memory 104 as mentioned above).

In the case where biometric data are previously stored, it is thus possible to use data such as an image of an iris or of the venous networks of a retina. At each activation these data can be compared with data obtained from measurements made by base 20 during the same activation.

Moreover, it is thus possible to ensure that an initial activation of module 10 by a base 20 involves a biometric measurement performed by this base 20 and stored in the form of biometric data in module 10 during activation. Activation will thus have to be performed using a dedicated base 20, which will allow to further increase the security level associated with the use of module 10.

The data, preferably the biometric data, are stored in module 10. Data relating to the same biometric parameter can also be measured by base 20 for activation purposes.

The wireless communication between the module and the base can be carried out directly between module 10 and base 20, or else via a personal piece of equipment such as a telephone 30. The wireless communication is for example a NFC-type or "Bluetooth" communication.

The skilled person will easily determine the technical features of the nearfield wireless communication circuit to allow module 10 to communicate with base 20. These features belong to the art of wireless communications through electronic devices and protocols, in particular secure protocols, which can be associated with such types of communication.

This communication allows checking that the module and the base have the same biometric data (or more generally identification data), and thus authenticating the user upon activation.

Presence Validation Means

The system formed by base 20 and module 10 allows checking that module 10 is worn by its wearer. By owner of module 10, it is meant for example the person whose data are stored in the memory of module 10.

A person can be defined as the owner of module 20 during its initial activation, in particular by storing the biometric data of this person in the memory of module 10.

This presence validation may therefore be regarded as validation of the module wearer's identity.

Module 10 also comprises as means for transmitting or receiving, or for receiving and transmitting, presence validation signals.

Module 10 may include presence validation means comprising means for transmitting and/or receiving presence validation signals. The presence validation means may comprise or consist of a presence validation device, for example an electronic circuit allowing such validation.

According to a first alternative, module 10 comprises means 112 for transmitting presence validation signals to said base 20.

According to a second alternative, the module 10 comprises means for receiving presence validation signals. Thus, according to this second alternative, module 10 comprises means 112 for receiving the presence validation signals from said base 20.

These transmission or reception means 112 are distinct from said communication circuit 110.

For example the transmission or reception means 112 include a receiver or transmitter that is independent from the communication circuit 110, and can transmit or receive signals independently and/or separately from communication circuit 110.

The presence validation signals allow validating the presence of the owner as wearer of module 10.

Validation can be performed by module 10 and/or base 20 and allows ensuring that the wearer indeed is the owner.

By validation, it can be meant the checking of a given criterion, namely the transmission and/or reception of signals. This check of a given criterion involves for instance a validation or invalidation response, typically in the form of a Boolean. Such a response is for instance provided following a given input, for example following the provision of an input variable value after a given time.

By validation signal, we hear it is thus meant a signal, the reception, the lack of reception, the transmission, the lack of transmission and/or the content of which, allows such a criterion to be checked.

The checking of the criterion can be ascertained by an electronic system, for example by base 20 and/or module 10, for example by computing means of base 20 and/or module 10.

Thus the skilled person will readily implement a signal for validation purposes, so called validation signal.

In particular, the skilled person will know how to implement a validation signal allowing validating the presence of the wearer, the owner and/or module 10.

According to a particular embodiment, its presence, meant as a detection at a certain distance from base 20, can in particular be understood as a detection in a specific area, for example an authentication area.

It is thus possible to further increase the security level associated with authentication module 10 and/or base 20, by ensuring that module 10 will be activated only if worn by a person who is its owner.

The presence validation signals thus enable a validation of the wearer's authentication.

The presence validation signals can be acoustic or electric signals adapted to be transported by the wearer's body. The presence validation signals may alternatively be optical signals, such as light waves transmitted by base 20 to be received by module 10, or vice versa. The transmitting or receiving means 112 typically comprise a signal source and a receiver adapted to sense and validate such signals.

This second inactivation means is responsive to a means for detecting the presence of the module on or in a support 40 for said module 10 on a wearer's body.

The skilled person will easily determine the technical features for the implementation of the means 112 for transmitting signals to said base 20 and/or for receiving signals originating from said base 20. These features belong to the art of communication and signal processing and protocols, particularly secure protocols, possibly associated together.

Similarly, the skilled person will readily determine the technical features of module 10 so that the wireless communication circuit 110 allows a communication with a base 20 and so that means 112 for signal transmission and/or reception transmit a signal for the same base 20 and/or receive a signal originating from the same base 20. The skilled person knows how to determine the technical features such that each of these means are associated with a base 20, and it is thus sufficient that the respective technical features of each of the means allow communication with the same base 20.

By communication with the same base 20, it is meant that it can be a given base 20 like any base 20 having a number of given features, it the same way as a smart card or magnetic stripe card is adapted to communicate with multiple terminals without however needing to store information relating to each terminal in the bank card.

According to one embodiment, it is thus possible to check that the person authenticated by his/her biometric data (the authentication being enabled by the wireless communication circuit(s) forming the wireless communication means) is indeed the one who wears module 10.

Indeed, the measurement of the biometric parameter of the biometric data can be selected and performed by the base, and the presence validation measurement can be selected and performed so that the person being authenticated by his/her biometric data is the one who attempts to validate his/her presence. For example, the biometric data may be a fingerprint and the presence validation may be a conductivity measurement by the module in response to the transmission of an electric field by the base so that the electric field is conducted by the finger presented for the fingerprint measurement by the base.

b) Worn Assembly

Figure 2A:
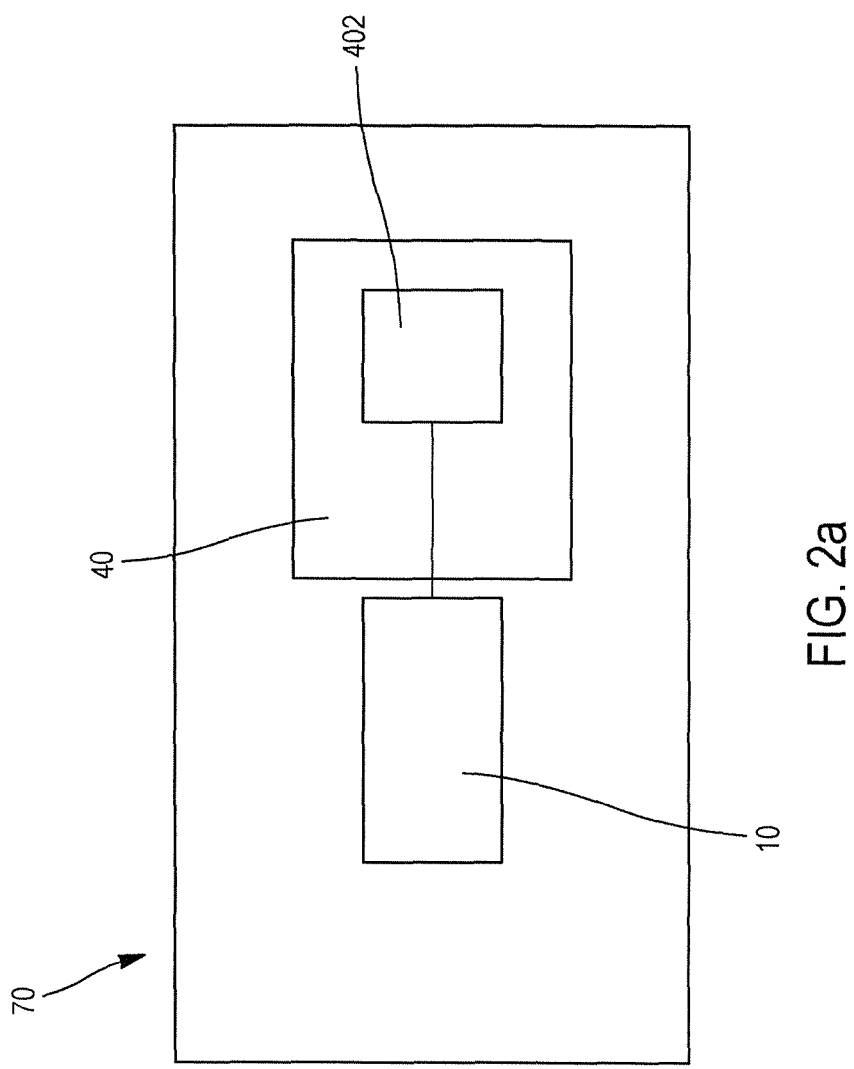
FIG. 2a shows an assembly comprising a module and a support according to an embodiment of the invention.
Figure 2B:
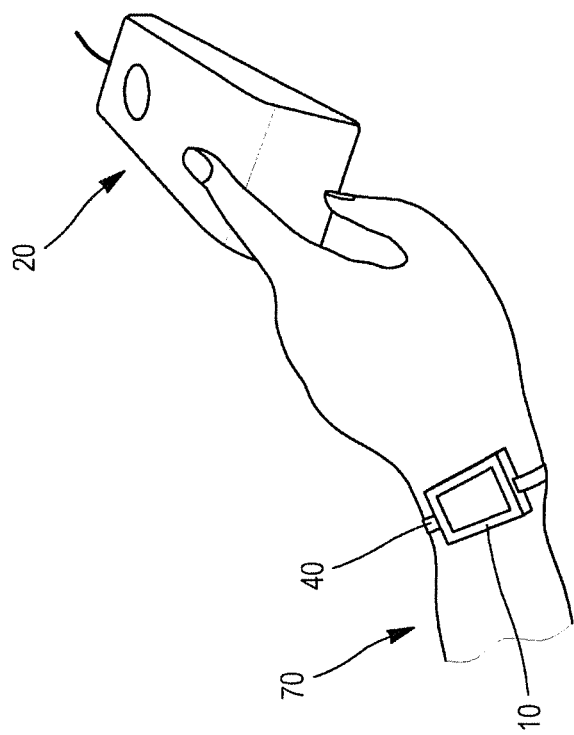
FIG. 2b shows a possible practical embodiment of the assembly of FIG. 2a, as well as a person authentication base.

Referring to FIGS. 2a and 2b, the module may be included in an assembly 70 comprising module 10 and a support 40 for said module 10.

The support 40 is for example in the form of a strap adapted to be attached to the wrist. The strap 40 may comprise means 402 connected to the module for determining the closing of strap 40 onto itself. The closing determination means 402 can be selected from a group consisting of electrical contact devices and devices relying on a material whose electrical properties vary as a function of their deformation, such as a carbon-containing elastomer. Thus it is possible to know if the strap 40 has been removed and to subsequently disable processing circuit 102.

The strap 40 is adapted to be worn by the user or wearer to allow his/her identification as a function of data previously recorded in authentication memory 104.

The module 10 may be an interface unit removably of fixedly attached to strap 40.

c) Practical Embodiment of Assembly

Referring to FIG. 3, strap 40 and module 10 can be put together in the same assembly 70 comprising a sensor circuit 702 that includes sensor 106 and optionally closure detection sensor 402. The sensor circuit 702 may also include an electronic circuit for validating the wearer's presence and authenticating same.

The assembly 70 is driven by a central unit 704 includes a low power microcontroller 706 powered and clocked appropriately and connected to the sensor circuit 702 comprising sensor 106 and possibly closure detection sensor 402.

The assembly includes a NFC stage 710 implements the wireless communication circuit 110, and optionally a stage 712 for communicating with a personal device 30, for example via a "Bluetooth" communications protocol.

The central unit may include a second microcontroller 708 with a processing power and memory size appropriate to form the processing circuit 102, to manage the backup of data at the authentication memory 104, to manage the wireless communications stage 710, to manage the optional stage 712 of wireless communications with a personal device 30, etc.

The assembly 70 also optionally comprises a user interface stage 714 comprising a display 716. Display 716 may have a touch screen functionality to allow interaction between the wearer and assembly 70. Display 716 is for instance a 1.5 in. touch screen with a 240 dpi resolution. Alternatively or in addition, the module has one or more control buttons.

Assembly 70 further comprises a power supply stage 718 for powering device 7, e.g. a battery that can be recharged by wire, wirelessly or by induction, with a suitable autonomy.

2) Example of a Base

Referring to FIGS. 2b and 4, the authentication base 20 capable of cooperating with module 10 will be described.

Base 20 may include means 202 for interfacing with a personal digital device 30. The personal digital device 30 is for example a personal digital assistant, a computer or a telephone. The interface means 202 can be wireless or wired, for example via USB connection. The interface means 202 includes an interface circuit belonging to an interface module.

Base 20 may also include a circuit 206 for wireless nearfield communication with said module 10 in response to control means 204.

Alternatively, a device distinct from base 20, such as the personal digital device 30, may comprise the circuit 206 for wireless nearfield communication with said module 10 as such, the latter being controlled by the control means 204 of base 20.

Thus, the control means 204 may be control means 204 adapted to allow a wireless nearfield communication with said module 10, e.g. means 204 for controlling a circuit 206 for wireless nearfield communication with said module 10, said circuit 206 being a circuit of base 20, or linked to base 20, for example connected to base 20, for example a circuit of an external device such as a personal digital device 30 connected to the base 20, for example by means of a wired connection.

The control means 204 comprise for example a microcontroller having input/output circuits. The wireless communication technology is for example a nearfield communication, so-called NFC for "Near Field Communication".

Base 20 further comprises means for acquiring and storing biometric data 208 of a wearer of module 10. The acquisition and storage means 208 typically are in the form of an acquisition and storage module comprising a sensor and processing means associated with a memory. The biometric data are those mentioned above in relation with the communication circuit 110 of the module. The biometric data acquisition means 208 may be involved with or without body contact with a wearer.

The biometric data may for example fingerprints or a palm vein pattern of the wearer.

Figure 5:
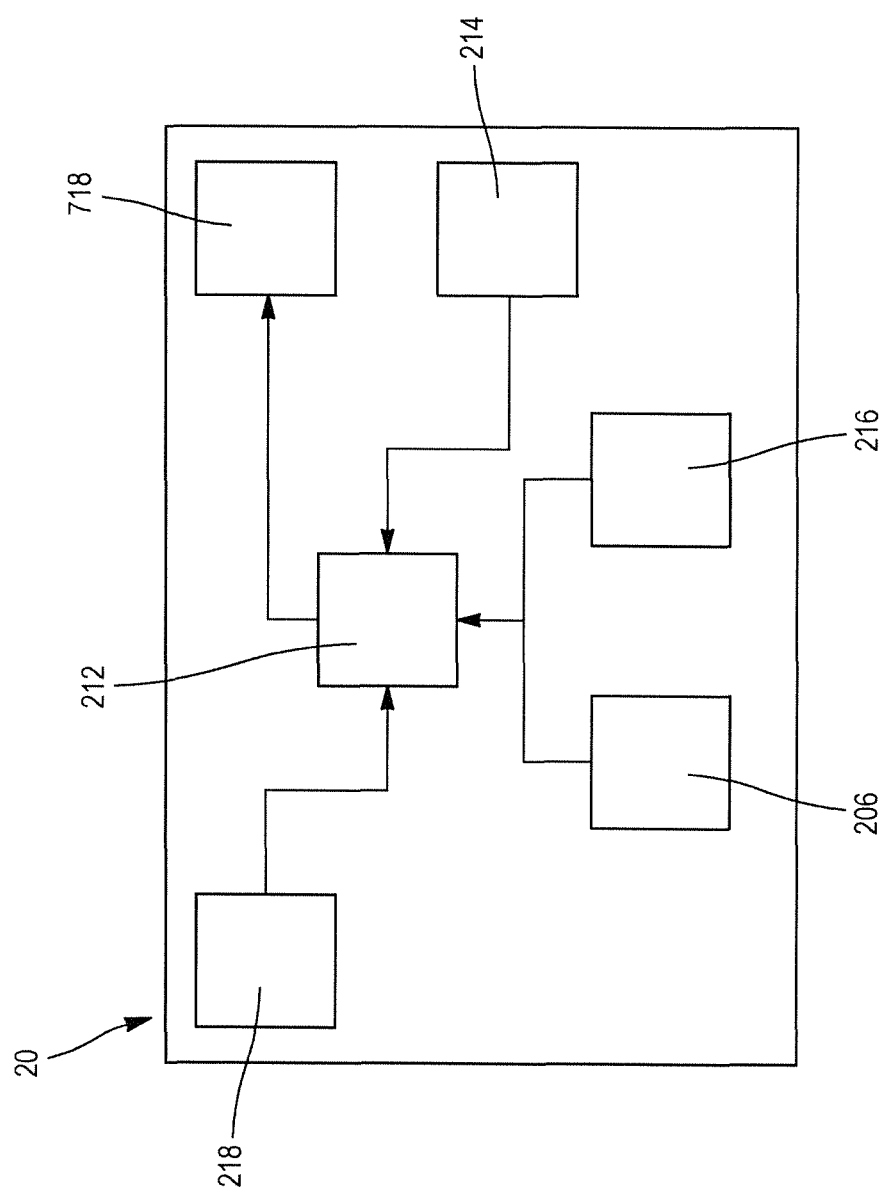
FIG. 5 shows an architecture of a person authentication base according to one embodiment of the invention.

Referring to FIG. 5, an exemplary architecture of the base 20 is described. Base 20 comprises a microprocessor stage 212 that retrieves the data from acquisition means 208. The microprocessor stage 212 also controls the wireless nearfield communication circuit 206 close to perform data communications with module 10.

Base 20 may include an identification stage 214 allowing the identification of wearer from the acquired biometric data.

Base 20 may include a sensor conditioning stage 216 performing the analog conditioning for acquiring biometric data or for validating the presence of the wearer by comparing the acquired data with those from module 10.

Base 20 comprises a power stage 218 to power the components of base 20.

3) Module/base Cooperation

Figure 6:
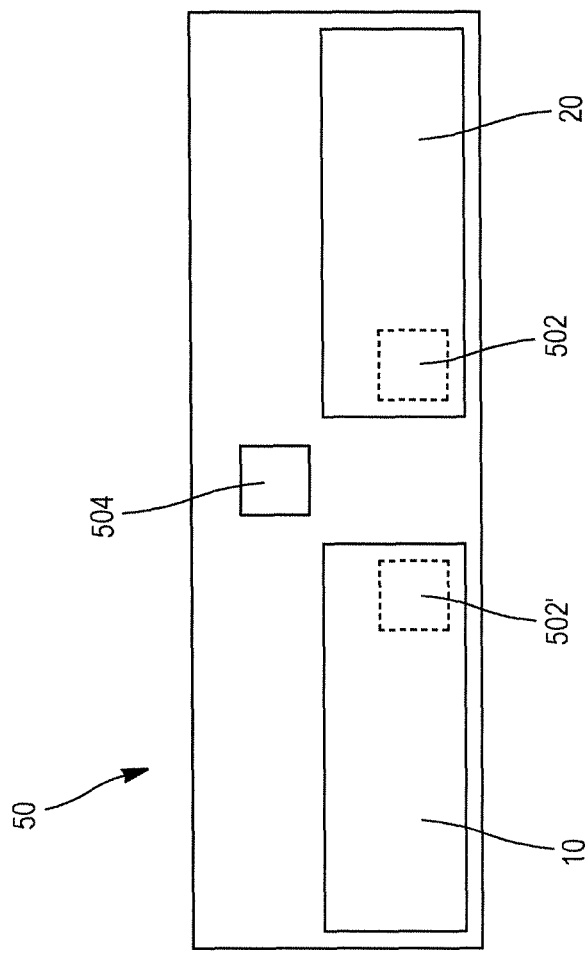
FIG. 6 shows a combination of an authentication module and an authentication base of according to an embodiment of the invention.

Referring to FIG. 6, an authentication module 10 and an authentication base 20 as described above can cooperate (which is schematically illustrated by reference 50) so as to authorize access to the biometric data, in particular so as to authorize module 10, or respectively base 20 to access the biometric data, in particular the biometric data in base 20, or respectively in module 10, only when a presence of module 10, preferentially of module and its owner, is validly detected at the base (see description below).

The biometric data in base 20 may be directly acquired on the wearer.

According to another embodiment, the biometric data in base 20 may be stored by the acquisition and storage means 208 of base 20, for example in a memory of base 20.

The biometric data in the module can be stored in a memory of module 10.

This detection is performed by a data processing at module 502 and/or a data processing 502' at the base.

By validly detected, it is meant a detection through validation as described above, e.g. by the means 112 for transmitting presence validation signals to said base 20 and for receiving presence validation signals from said base 20.

This cooperation involves a comparison 504 of the biometric data acquired by the base with reference biometric data. According to one embodiment, this comparison is performed upon activation of the module which has previously been subjected to initial activation.

Comparing means 504 may be provided in module 10, in base 20, and/or in a device distinct from module 10 and base 20.

Comparing means 504 may be located in module 10, with the biometric data acquired by base 20 being transmitted to module 10 via wireless nearfield communication circuits 206 provided in base 20 or in personal digital device 30. Alternatively, comparing means 504 may be located in base 20, with the reference biometric data being stored in module 10 and transmitted to base 20 via wireless nearfield communication circuits 206.

In addition, comparing means 504 may be provided in a device distinct from module 10 and base 20, connected to module 10 and/or to base 20.

Authentication memory 104 in module 10 may be capable of storing authentication data sets capable of being communicated to said base 20 and/or to personal digital device 30 interfaced via wireless nearfield communication circuits 206 for the purpose of transacting with digital devices connected to said base 20.

4) Inactivation of the Module Processing Circuit

Inactivating the processing circuit 102 of module 10 is implemented by inactivation means 108 of circuit 102 responsive to said sensor 106 and is capable of inactivating circuit 102 when said sensor 106 does not receive an expected physiological signal.

Such inactivation means 108 may for example be rely on a skin conductivity measurement. Measuring the skin conductivity allows estimating the activity of the sweat glands in the skin. Thus, a high activity of these glands will be associated with a high skin conductivity and low activity will be associated with low conductivity. Measuring the skin conductivity is generally carried out at the extremities (hands and feet) as the number of sweat glands is larger in these zones. The measurement can be made from two electrodes in which a low magnitude current (DC or AC) is injected and then the voltage generated across the electrodes is measured. The electrodes used to perform the measurement can be electrodes made from Ag/AgCl.

The fact that a conductivity value measured by sensor 106 is less than a determined threshold (possibly programmable) may therefore indicate a separation between module 10 and the wearer, the inactivation means 108 then performing an inactivation of processing circuit 102, preventing the use of module 10. Such a measurement ensures high reliability and high security for module 10.

The inactivation means 108 may alternatively rely on the measurement of a distributed electrical conductivity. The distributed electrical conductivity, measured by a piezoelectric sensor, allows checking that module 10 is in a generally stable position. If strap 40 is removed, the electrical conductivity will change, thus allowing detecting a possible opening (practical embodiment to be specified).

The inactivation means 108 may also rely on a measurement of variation of capacitance of an elastic polymer of assembly 70, for example of strap 40. The purpose here is to measure the elastic deformation of the strap material, which would indicate removal of assembly 70. The material is for example an electro-active polymer. The electro-active polymer is a material whose shape or size changes when placed in an electric field or which can exhibit a change in its electrical resistance or capacity when subjected to a change in its geometry. Thus, when the material is stretched, there occurs a variation in its capacity which is detected by a detection circuit for causing inactivation.

The inactivation means 108 may also include means for measuring variations of electrical resistance, for example at a sensor contained in assembly 70, for example of strap 40. The purpose here is to measure the elastic deformation of the strap material which would indicate a removal of assembly 70. The sensor is for example a bend sensor in the form of a strip whose resistance varies as a function of the diameter to which the sensor is bent. The sensor is usefully supplemented by a sensing circuit for causing inactivation.

5) Base/module Association

There is also provided according to an embodiment of the invention, means for checking at base 20 that an expected module 10 is present. These means thus form means for validating the presence of base 20.

A first embodiment of these means may involve a measurement of skin conductivity both at module 10 and at base 20, the two signals being then compared either in base 20 (after transmission to the base of the signals sensed in the module by the wireless communication means) or in module 10 (after transmission to the module of the signals sensed in base by the wireless communication means).

Alternatively, these means can involve a measurement of the heart rate of the wearer by photoplethysmography. The measurement is carried out using a light source and a photodiode. The light source illuminates a specific area of the wearer's body (preferably at a finger, which has the property of being highly vascularized), for example with a first light emitting diode having a wavelength of 660 nm and a second light emitting diode having a wavelength of 940 nm to improve the performance of the measurement, and changes in blood volume generate a variation in the light intensity measured by the photodiode. The measurement can be performed at device 70, e.g. by reflection of light by the blood, and at base 20, e.g. by transmission, to then allow a comparison with a reference in order to obtain a validation.

According to one embodiment, base 20 includes means 210 for transmitting or receiving of signals validating the presence of module 10, distinct from communication circuit 206. The presence validation signals intended to said module and/or originating from said module may typically be modulated acoustic, electrical or optical signals.

In the case where the acquisition of biometric data 208 is implemented by contact with a wearer's body (in particular the case of fingerprints), the signals preferably are acoustic or electrical signals transported by the wearer's body, between the wrist (zone where assembly 70 is attached) and the finger tip. To this end, assembly 70 or base 20 comprises an acoustic transducer for example of piezoelectric type or an electrode for applying to the body area with which it is in contact signals which are modulated according to a predetermined modulation pattern. These signals, after having travelled through the user's finger, are detected by a corresponding sensor (other acoustic transducer or other electrode), respectively provided in base 20 or in assembly 70. If the expected modulation (which also can encode information) is detected, then the presence of assembly 70 is validated by the base. In the case where it is assembly 70 that receives the signals, the processing can be performed in module 10 and the validation transmitted to the base by the wireless communication circuit.

In the case where the acquisition means 208 of the biometric data is carried out without contact with the user's body (for example camera taking an image of the palmar venous network), the signals intended to allow module presence validation advantageously are optical signals. These optical signals may be constituted by a modulated optical signal, collected by the aforesaid camera in addition to the venous network, or else by a graphic pattern generated for example on a LCD-type screen provided on the module, this pattern being captured at the same time as the venous system for validation.

In all cases, if the expected signals are not present, this means that the expected module 10 is not present, and the identification and/or authentication functionalities of the system of the invention are not active.

6) Examples of Identification/authentication Functionalities a) Identification of an Authorized User on a Computer in Replacement of the Login and Password Conventionally Required by an Operating System The user installs a dedicated program on the computer(s) on which he wishes to identify himself/herself.

It connects base 10 via a USB cable (or another protocol, wired or wireless) to the computer.

The program invites him to bring his/her wrist bearing assembly 70 close to base 20, and an encrypted file is then loaded into the memory of module 10, this file containing the user login and password for this computer.

At the next use, the user will simply have to bring his/her wrist provided with assembly 70 close to base 20 to achieve session opening.

Optionally, the user can parameterize a duration for the session to remain open.

b) Identification by Storage of Logins and Passwords of Different Secure Websites Visited by Means of a Browser The user installs a plugin for his Internet browser.

This plugin will automatically load logins and passwords pre-recorded by the browser and store them in an encrypted form in the secure memory 104 of module 10. The user will thus have, on any computer with a browser having this plugin installed, the possibility of having his logins and passwords automatically pre-filled when establishing a connection with these secure sites, and will simply need to validate e.g. by a mouse click.

c) Authentication on Compatible Websites

The user visits a website offering an identification applet compatible with the system of the invention.

At his/her first login, the user is prompted to enter his/her contact information (like for a conventional user), but inputs no login or password. Following the validation of registration by the user, the applet loads an encrypted file into the secure memory 104 of module 10, allowing him/her to be automatically identifier using assembly 70 that he/she carries upon subsequent visits to the site.

To allow some degree of control to the user, he/she can advantageously, at any time, change the status of identification among the following:

always authorized: the user just needs to bring assembly 70 (worn at the wrist) close to base 20 for the authentication to be performed automatically;

authorized on a case-by case basis: the user must present his/her assembly 70 then perform validation on the interface of module for achieving authentication;

denied: every read attempt to read will be ignored. The user will therefore be able to access only the part of the site that does not require identification;

revoked: upon a reading attempt, module 10 transmits a revocation request to the applet of the website which will (according to local regulations) have to delete the user's personal data from its servers.

d) Loading a Contactless-readable Payment Means or Loyalty Card

The user in possession of a contactless-readable payment instrument or loyalty card (e.g. a PayPass NFC-readable bank card) can transfer this payment instrument to module 10.

For this purpose, he/she installs a dedicated application on his/her computer and enters the identification data linked to this payment card. It must also put the card then his/her module 10 (worn on the wrist) within range of the NFC reader of base 20. After these checks, the program loads the data of the payment card into the secure memory of module 10.

Then, when the user wants to make a payment, he/she brings assembly 70 worn on his/her wrist close to a NFC payment terminal to perform the transaction, for example with an automatic debit for a small payment or the need to validate the transaction via the interface of module 10 (button or touch screen) for a larger payment.

Naturally, all the functionalities are inactivated (inactivation of central unit 102) when the module/strap assembly is not worn by the user and, when the base 20 is involved, when the module/base association is not achieved (see above).

7) Use a) Set-up

For setting-up the system, the user is prompted to place the module in the strap (unless they already form a whole—assembly 70—from the start) and to position the assembly on his/her wrist.

The module is launched and detects if needed the physiological parameters corresponding to the user's wrist (temperature, heart rate, skin conductivity) and enters into initialization mode.

In parallel, the base is connected to a power supply.

According to one embodiment, the user, by positioning his finger on base 20, then causes a transmission of the presence validation signal, such as a modulated signal transported through the skin between the finger and the wrist via a transmitter of base 20 on which the user's finger is positioned and via the sensor of module 10, itself located at the user's wrist. The comparison between the transmitted and measured signals, when it results in a match between the signals, triggers the reading of his/her fingerprint or of his/her the venous network, and the corresponding digital image is transmitted to the module via the wireless communication circuits for being stored therein. The module 10 then switches to the active state.

b) Stanby and Reactivation

Bringing module 10 into standby or inactive mode by the user is performed by merely removing assembly 70, e.g. during the night. This implies the possibility to reactivate it. The user uses base 20 for this purpose.

He/she places the assembly on his/her wrist and causes a transmission of the presence validation signal and a measurement of this signal, a comparison of the transmitted and measured signals and then, in case of matching, a reading of his/her fingerprint on base 20. It is sent to module 10 via the wireless communication circuits. If this matches with the stored fingerprint profile, module 10 becomes active. Otherwise, nothing happens.

c) Data Backup

In case of loss, theft or malfunction of module 10, the user must be entitled to continue to access the services.

To this end, base 20 has a memory unit drive (e.g. in the form of a USB stick). Upon each reactivation, the data contained in the secure memory of module 10 are stored in encrypted form in this memory unit (including the associated fingerprint profile). The user can perform as many backups as desired (through as many reactivations). To restore these data, the user just needs to initialize a new module 10 with his fingerprint. If there is a match with the fingerprint profile stored in the memory unit, the data in this unit are decrypted and transferred to the secure memory of the new module. The user can again use the services.

d) Fraudulent Uses

To prevent fraudulent use of a lost or stolen unit 10, following this restoration of services, each stored identity is labeled as a "recovered" identity. During an identification, the applet of the visited website will be informed of this status. It will then be capable of providing a new identity for storage in the module secure memory, and revoke the previous identity.

This functionality is of course possible only with identifications made on sites having the compatible applet. For the other stored identifiers, the user will possibly have a piece of software allowing him/her to be guided for manually replacing his/her corrupt passwords.

In case of loss, theft or malfunction of the base, it can be replaced with a new base without difficulty, at least with regard to the embodiment where it does not contain any data.

8) Variants of Biological/biometric Parameters

As a reminder of the possibilities described above and in addition thereto, the system may involve one or more of the following measurements:

skin conductivity: the conductivity is measured at regular intervals. A discontinuity is considered as an abnormal condition;

temperature and proximity: an infrared sensor measures at regular intervals the proximity and temperature of the user. A discontinuity will also be identified as an abnormal condition;

heart rate: a sensor measures the user's heart rate. A loss of information will be perceived as an abnormal condition.

Furthermore, in order to avoid false positives, a program can be implemented to control the coincidence of two or more of these abnormal conditions to indicate to controller 102 whether it must switch to inactive mode.

9) Alternative Embodiment a) Module Validation Signal Reception Means

According to another embodiment, the person authentication module 10 may include, alternatively or in addition to the above-described presence validation signal transmitting and/or receiving means, means forming second presence validation signal means from the wearer's body.

In particular, module 10 can be configured so that the presence validation means may include these second means for receiving presence validation signals from the wearer's body.

The second means for receiving presence validation signals may be configured so that the presence validation signals are distinct from the signals transmitted and/or received by the wireless communication circuit when it communicates with the base according to a protocol involving biometric data.

These second presence signal receiving means can thus be distinct from said communication circuit 110.

b) Means for Receiving Presence Validation Signals in the Base

Moreover, base 20 may also comprise, alternatively or in addition to the means for transmitting of the presence validation signals to said module and/or for receiving validation signals described above, second means for receiving presence validation signals from the wearer's body.

In particular, base 20 may be configured so that the presence validation means may include these second means for receiving presence validation signals from the wearer's body.

The second means for receiving presence validation signals may be configured so that the presence validation signals are distinct from the signals transmitted and/or received by the wireless communication circuit 206 when it communicates with module 10 according to a protocol involving biometric data.

These second means for receiving presence signals may thus be distinct from said communication circuit 110.

The second means for receiving presence validation signals in module 10 and/or base 20 may for example each comprise or be formed of a presence validation signal sensor, for example a sensor of a wearer's physiological signal.

c) Signal Comparison Means

The presence validation means in module 10 and/or base 20 may include signal comparison means to enable to allow validating the presence of the wearer and/or of module 10 near base 20.

Indeed, module 10 and base 20 can receive signals via their second receiving means. These signals can then be compared by the comparison means to validate the presence of the wearer and of module 10 near base 20.

If the signals are identical, or similar enough, one thus can consider that the person is indeed the one wearing module 10, and allow access to base 20 or activation of module 10 by base 20.

According to one embodiment, the person at stake is the person whose biometric data match biometric data recorded on the memory of module 10, such a comparison having been permitted by the wireless communications circuit(s).

According to this embodiment, it is thus possible to check that the person authenticated by his/her biometric data, the authentication being permitted by the wireless communications circuit(s) of forming the wireless communications means, is indeed the one who wears module 10.

Indeed, the measurement of the biometric parameter of the biometric data may be selected and performed by the base, and the presence validation measurement may be selected and performed so that the person being authenticated by his/her biometric data is one who attempts to validate his/her presence.

For example, the biometric data may be a fingerprint and the presence validation a heart rate measurement by the module and the base simultaneously for comparison purposes, so that the heart rate is measured by the base at the finger presented for measurement of the fingerprint by the base.

In a particular embodiment, the person at stake is a person in the vicinity of base 20.

For example, the signals received by module 10 can be transmitted to module 20, or vice versa. The transmission/reception can be achieved by means of the above-described wireless communication, for example according to the protocol involving the biometric data or according to a different protocol.

The signal comparison means may for example comprise or be formed of a signal comparison device, for example an electronic circuit allowing such a comparison.

d) Means for Controlling Signal Type

The presence validation means of module 10 and/or base 20 may include means for controlling the type of signals received by the second presence validation signal receiving means of module 10 and/or base 20.

Before or after the signals are compared, the signals obtained from measurements performed simultaneously by the second presence validation signal receiving means of module 10 and base 20 may be subjected to a checking step so as to verify that they do correspond to presence validation signal of the wearer.

For example, the expected signal can be the wearer's heart pulse and the presence validation means of module 10 and/or the base can verify that the measurements made do correspond to a heart pulse.

In another example, a measurement of the skin conductivity can be achieved both at module 10 and base 20 by the second presence validation means, the two signals being then compared either in base 20, after transmitting to the base, e.g. via the wireless communication circuit forming the wireless communication means, the signals collected in the module, or in module 10, after transmitting to module, e.g. via the wireless communication circuit forming the wireless communication means, the signals collected in the base.

It is thus possible in particular to avoid that signals corresponding to a module that is not in contact with a wearer and to a base at which a wearer has not introduced himself/herself, e.g. identical null signals, are compared and/or allow erroneously validating the presence of a wearer.

Means for verifying the type of received signals may for example include or be formed of a device for verifying the type of the received signals, for example an electronic circuit allowing such verification.

Of course, the present invention is not limited to the embodiments described and shown, and the skilled person will be able to bring thereto many variants and modifications with his general knowledge.

The invention claimed is:

1. A module intended to be worn by a wearer for authenticating said wearer, comprising:
a processing circuit comprising an authentication memory,
a sensor of a wear-related parameter,
a means for inactivating the processing circuit responsive to the sensor when said sensor does not receive an expected signal,
a circuit for wireless nearfield communications with a base according to a protocol enabling reception of biometric data of a person to be authenticated, said data being distinct from said wear-related parameter, in order to authenticate the wearer by said processing circuit comparing the received biometric data with biometric reference data, and
means for at least one of transmitting a presence validation signal and receiving a presence validation signal, distinct from said wireless nearfield communications circuit, said signal allowing a validation of the presence of a wearer corresponding to said biometric data,
wherein said sensor generates at least one of an activation signal and said presence validation signal.

2. A module according to claim 1, wherein said means for at least one of transmitting said presence validation signal and receiving said presence validation signal cooperate with a corresponding reception/transmission means in said base.

3. A module according to claim 1, wherein said presence validation signal is an acoustic signal adapted to be transported by the wearer's body, or an electric signal adapted to be transported by the wearer's body, or an optical signal, or a blood pulse signal.

4. A module according to claim 1, wherein said sensor of a wear-related parameter is one of a body temperature sensor, a heart rate sensor and a skin conductivity sensor.

5. A module according to claim 1, further comprising a second means for inactivating the processing circuit, responsive to a means for detecting the presence of the module on or in a support for said module on a wearer's body.

6. An assembly of a module according to claim 1 and a support for said module, the support being in the form of a strap.

7. An assembly according to claim 6, wherein said strap comprises means connected to said module for detecting the closure of the strap on itself.

8. An assembly according to claim 7, wherein said closure detection means are one of electrical contact devices and devices exhibiting a variation of electrical properties as a function of deformation of said electrical contact devices.

9. An authentication base for a module according to claim 1, comprising:
means for interfacing with a personal digital device,
means for acquiring and storing said biometric data of said person to be authenticated,
means for controlling a circuit for wireless nearfield communications accessible from said base and communicating with said module intended to be worn by said person according to a protocol allowing the transmission of said biometric data to said module for the purpose of authenticating the wearer by comparison of said biometric data with reference data in said module, and
means for one of transmitting said presence validation signals to said module and for receiving said presence validation signals from said module, distinct from said wireless nearfield communications circuit, said signal for validating the presence of a wearer corresponding to said biometric data.

10. An authentication base according to claim 9, wherein said wireless nearfield communications circuit is provided in the base.

11. An authentication base according to claim 9, wherein said biometric data acquisition means involve physical contact with a wearer's body, and said presence validation signal is at least one of an acoustic signal and an electrical signal transported by one of the wearer's body and a physiological signal.

12. An authentication base according to claim 11, wherein said acoustic or electrical signal is modulated.

13. An authentication base according to claim 11, wherein said biometric data are fingerprint data.

14. An authentication base according to claim 9, wherein said biometric acquisition means operate without physical contact with a wearer's body, and wherein the means for at least one of transmitting and receiving said presence validation signal comprise means for at least one of transmitting and detecting an optical signal.

15. An authentication base according to claim 14, wherein said optical signal comprises at least one of a modulated optical signal and a graphic pattern.

16. An authentication base according to claim 14, wherein said biometric data are venous pattern data.

17. The authentication base according to claim 11, wherein the physiological signal is a blood pulse signal.

18. The authentication base according to claim 16, wherein the venous pattern data is a hand palm venous pattern.

19. An authentication system, comprising a module intended to be worn by a person and a base,
said authentication module comprising:
   a processing circuit comprising an authentication memory,
   a sensor of a physiological parameter of the wearer,
   a means for inactivating the processing circuit responsive to the sensor when said sensor does not receive an expected physiological signal,
   a circuit for wireless nearfield communications with said base, for communicating with said base according to a protocol enabling the reception from said base of biometric data of a person to be authenticated, said data being distinct from said physiological parameter, in order to authenticate the wearer by said processor comparing the received biometric data with biometric reference data, and
   wherein said sensor generates at least one of said activation signal and said presence validation signal, and
said authentication base comprising:
   means for interfacing with a personal digital device,
   means for acquiring and storing said biometric data of a person to be authenticated,
   means for controlling said circuit for wireless nearfield communications accessible from said base and communicating with the wireless nearfield communications circuit of said module according to said protocol, and
the assembly further comprising means for transmitting a presence validation signal from said base to said module or vice-versa, distinct from said wireless nearfield communications circuit, said signal being adapted for validating the presence of a wearer corresponding to said biometric data.

20. The system according to claim 19, further comprising means for authorizing the module or the base to access the biometric data only when the presence validation signals transmitted by said module are validly detected by said base.

21. The system according to claim 19, further comprising means for authorizing the module or the base to access the biometric data only when the presence validation signals transmitted by said base are validly detected by said module.

22. The system according to claim 19, wherein said authentication memory of said module stores authentication data sets for communicating to at least one of said base and the personal digital device interfaced via the wireless nearfield communications circuits for the purpose of transacting with digital devices connected with said base.

\* \* \* \* \*